(12) United States Patent
Tseng et al.

(10) Patent No.: US 7,843,079 B2
(45) Date of Patent: Nov. 30, 2010

(54) POWER GENERATING DEVICE CAPABLE OF OUTPUTTING AT CONSTANT ROTATION SPEED

(75) Inventors: Jui-Tang Tseng, Pingtung County (TW); Yun-Yuan Chang, Taipei (TW); Jung-Kuei Lin, Hsinchu (TW); Chien-Chiang Tung, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 382 days.

(21) Appl. No.: 12/172,339

(22) Filed: Jul. 14, 2008

(65) Prior Publication Data
US 2009/0236854 A1 Sep. 24, 2009

(30) Foreign Application Priority Data
Mar. 21, 2008 (TW) ............................. 97109990 A

(51) Int. Cl.
*F16H 3/72* (2006.01)
(52) U.S. Cl. .............................. 290/45; 290/55; 415/4.3
(58) Field of Classification Search ........................ None
See application file for complete search history.

(56) References Cited

U.S. PATENT DOCUMENTS

| | | | |
|---|---|---|---|
| 4,774,855 A | 10/1988 | Murrell et al. | |
| 5,856,709 A * | 1/1999 | Ibaraki et al. | 290/45 |
| 5,982,045 A * | 11/1999 | Tabata et al. | 290/17 |
| 6,335,573 B1 * | 1/2002 | Eguchi et al. | 290/40 C |
| 7,256,510 B2 * | 8/2007 | Holmes et al. | 290/45 |
| 7,600,963 B2 * | 10/2009 | Miller | 415/4.3 |
| 2004/0023740 A1 * | 2/2004 | Benassi et al. | 475/207 |
| 2005/0146141 A1 | 7/2005 | Basteck | |
| 2006/0237246 A1 * | 10/2006 | Severinsky et al. | 180/65.2 |
| 2009/0230686 A1 * | 9/2009 | Catlin | 290/54 |
| 2010/0044127 A1 * | 2/2010 | Sartre | 180/65.22 |
| 2010/0150718 A1 * | 6/2010 | Freda | 416/120 |

FOREIGN PATENT DOCUMENTS

| | | |
|---|---|---|
| DE | 10357292 | 8/2005 |
| JP | 2004162652 A | 6/2004 |

* cited by examiner

*Primary Examiner*—Michael C Zarroli
(74) *Attorney, Agent, or Firm*—WPAT, PC; Justin King

(57) ABSTRACT

A power generating device capable of outputting at a constant rotation speed is configured with a constant speed unit for transforming a varying input rotation speed into a constant output rotation speed, which comprises: a power source, an electric generator and a constant speed unit; wherein the constant speed unit further comprises: a first differential gear set, having two input ends and an output end being configured in a manner that one of the two input ends is connected with the power source and the output end is connected to a load; a continuously variable transmission (CVT) mechanism, configured with an input end and an output end in a manner that the input end is connected to the power source; a hydraulic torque converter, configured with an input end and an output end in a manner that the input end is connected to the load; a second differential gear set, configured with two input ends and an output end in a manner that the two input ends are connected respectively to the output end of the CVT mechanism and the hydraulic torque converter so as to perform a power composition process in the second differential gear set and then transmit the composite power from its output end to the other input end of the first differential gear set that is not connected to the power source.

7 Claims, 6 Drawing Sheets

POWER GENERATING DEVICE CAPABLE OF OUTPUTTING AT CONSTANT ROTATION SPEED

BACKGROUND OF THE INVENTION

1. Field of the Invention

The present invention generally relates to a power generating device and, more particularly, to a wind power system capable of transforming a varying rotation speed into a constant rotation speed.

2. Description of the Prior Art

The wind turbine is a power transforming system capable of transforming wind power into mechanical power and then mechanical power into electrical power. Nowadays, all the large wind turbines are grid-tied so that the power generated by the wind turbines can be fed into the grid. However, the power of the grid has a constant frequency and a constant voltage. Therefore, there must be a certain apparatus for transforming the varying frequency power into the constant frequency power.

In JP2004162652A (2004) as shown in FIG. 1, a rotor 10 transmits the power to the electric generator 11 through two transmission paths 101 and 102. In the first transmission path 101, gear sets 12 and 13 and gear sets 14 and 15 are used to transmit the power to an internal gear of the planetary gear set. In the second transmission path 102, the torque and rotation speed are controlled by a continuously variable transmission (CVT) mechanism and part of the power from the rotor is transmitted to a planet carrier of the planetary gear set through gear sets 16 and 17 and gear sets 18 and 19. The planetary gear set is a differential gear train, wherein the internal gear and the planet carrier are the inputs. The sun gear 111 outputs the power to the electric generator 11. This disclosure is characterized in that the output rotation speed of the continuously variable transmission (CVT) mechanism is controlled and the differential gear train is used to keep the rotation speed of the electric generator as a constant.

In US2005146141A1 (DE10357292) filed by Voith in 2005 as shown in FIG. 2, the planetary gear set is a differential gear train. Two transmission paths are used to keep the rotation speed of the electric generator as a constant. First, the rotation speed of a rotor 20 is increased by a main gear box 21 and the rotor 20 transmits the power to a planet carrier of the differential gear train. A sun gear shaft 22 is used as an output shaft of the differential gear train to transmit the main power to the electric generator 23. The torque and rotation speed are controlled by a hydraulic torque converter 24, then the other power is transmitted to the internal gear of the differential gear train through the gear set 25. The output speed of the differential gear train is controlled as a constant, so that the rotation speed of the electric generator is kept as a constant. The torsional vibration and load fluctuation are eliminated by liquid damping of the hydraulic torque converter. These increase the compatibility between the wind turbine and the grid and reduce the load acting on other devices. However, the hydraulic torque converter is sensitive to temperature variation and has low efficiency at low rotation speed.

In U.S. Pat. No. 4,774,855A1 (1988) as shown in FIG. 3, hydraulic static transmission and planetary differential gear train are used to perform speed control. The rotation speed of a rotor 30 is increased by a main gear box. The power is divided into two parts. Part of the power is transmitted to a planet carrier in the differential gear train through gear sets 31 and 32, while another part of the power is transmitted to a sun gear 39 of the differential gear train through gear sets 31 and 33, a hydraulic pump 34, hydraulic pipelines 35, a hydraulic motor 36, and gear sets 37 and 38. The differential gear train performs a speed control so that the internal gear can output with constant rotation speed. However, hydraulic static transmission is sensitive to temperature variation and has low efficiency at a low rotation speed, otherwise, the phenomenon of nonlinear for hydraulic static transmission must be considered.

SUMMARY OF THE INVENTION

It is one object of the present invention to provide a power generating device comprising a constant speed unit capable of transforming a varying rotation speed into a constant rotation speed so that the power generating device can be grid-tied without a power inverter to invert the power with a different frequency into the power with a constant frequency. That reduces hardware cost and simplifies control on the electric generator.

In one embodiment, the present invention provides a power generating device capable of outputting at a constant rotation speed, comprising:

a power source, an electric generator and a constant speed unit;

wherein the constant speed unit further comprises:

a hydraulic torque converter;

a continuously variable transmission (CVT) mechanism;

a first differential gear set comprising two input ends and an output end, wherein the first differential gear set is connected to the power source through a first transmission shaft comprising a first gear set connected to an input end of the continuously variable transmission (CVT) mechanism, and the first differential gear set is connected to the electric generator through a second transmission shaft comprising a second gear set connected to an input end of the hydraulic torque converter; and a second differential gear set comprising two input ends and an output end, wherein the two input ends of the second differential gear set are respectively connected to an output end of the continuously variable transmission (CVT) mechanism and an output end of the hydraulic torque converter, and the output end of the second differential gear set is connected to the other input end of the first differential gear set, so that the partial power is controlled by the second differential gear set and transmitted to the electric generator through the output end of the first differential gear set.

In another embodiment, the present invention provides a power generating device capable of outputting at a constant rotation speed, comprising:

a power source, an electric generator and a constant speed unit;

wherein the constant speed unit further comprises:

a hydraulic static transmission device;

a continuously variable transmission (CVT) mechanism;

a first differential gear set comprising two input ends and an output end, wherein the first differential gear set is connected to the power source through a first transmission shaft comprising a first gear set connected to an input end of the continuously variable transmission (CVT) mechanism, and the first differential gear set is connected to the electric generator through a second transmission shaft comprising a second gear set coupled to an input end of the hydraulic static transmission device; and a second differential gear set comprising two input ends and an output end, wherein the two input ends of the second differential gear set are respectively connected to an output end of the continuously variable transmission (CVT) mechanism and an output end of the hydraulic static transmission device, and the output end of the second differential gear set is connected to the other input end of the first differential gear set, so that the partial power is controlled by the second differential gear set and transmitted to the electric generator through the output end of the first differential gear set.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention can be exemplified by the embodiments as described hereinafter.

Figure 1:
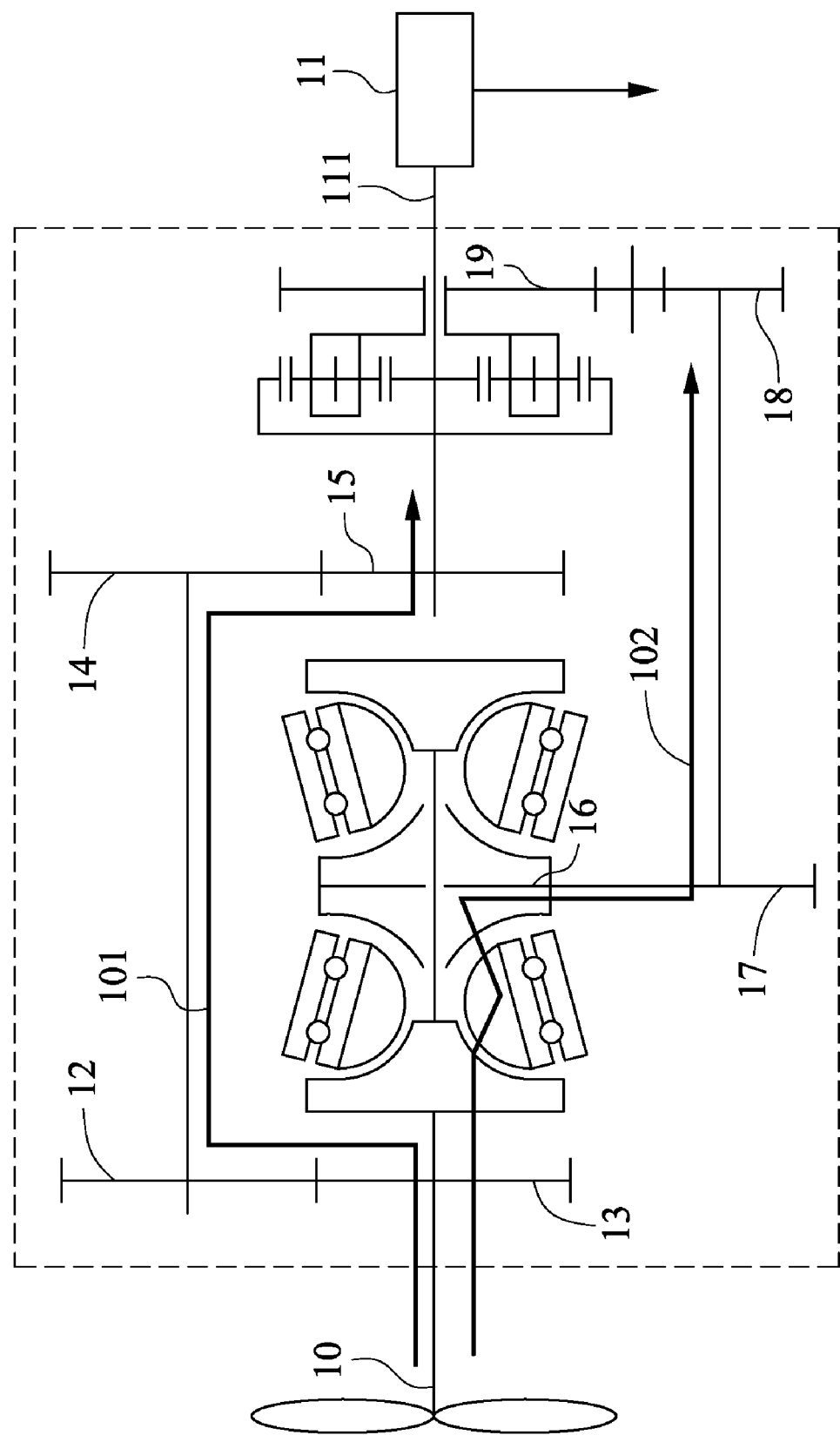
FIG. 1 to FIG. 3 are schematic diagrams showing the main portions in conventional wind power systems in the prior arts.
Figure 2:
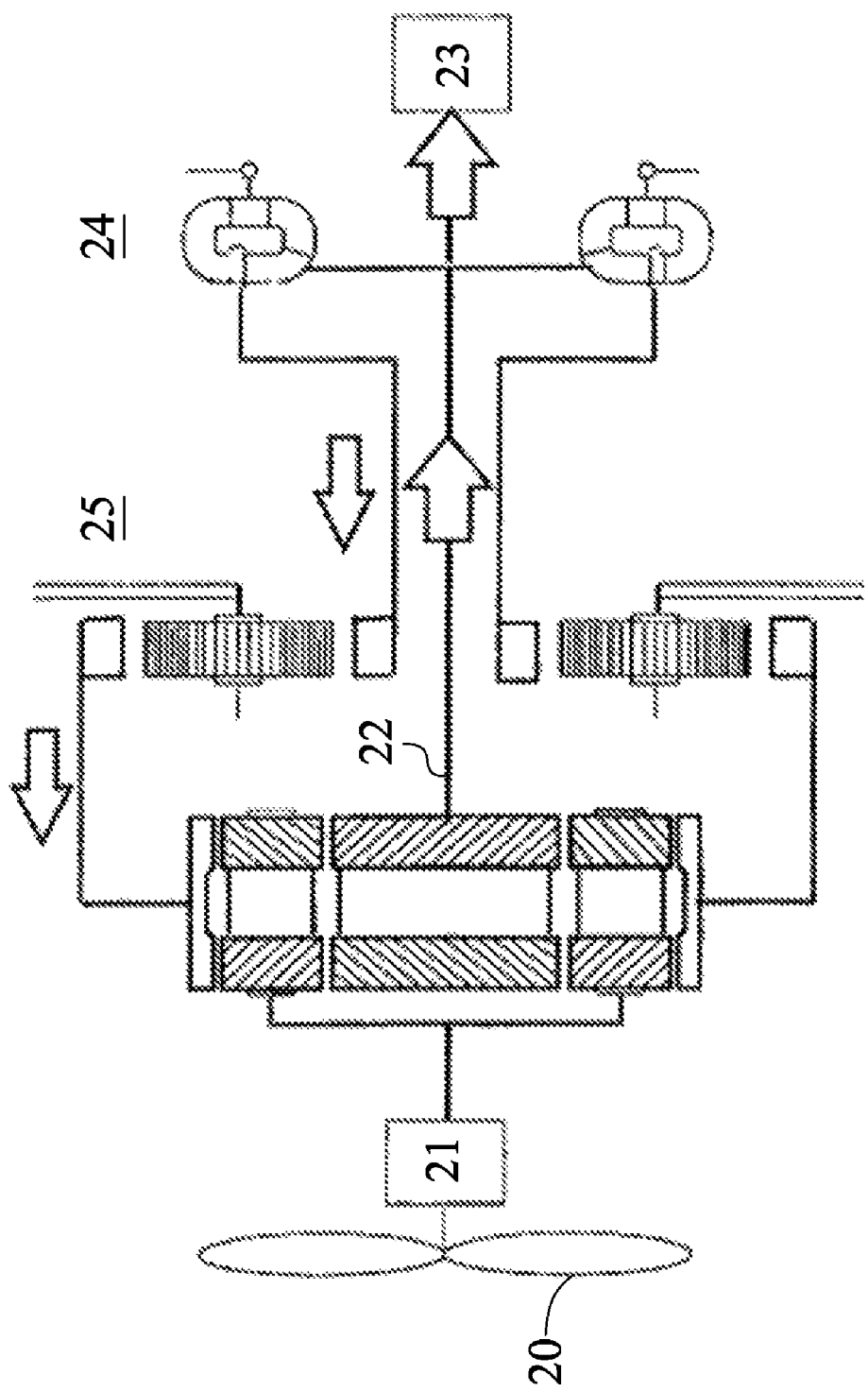
Figure 3:
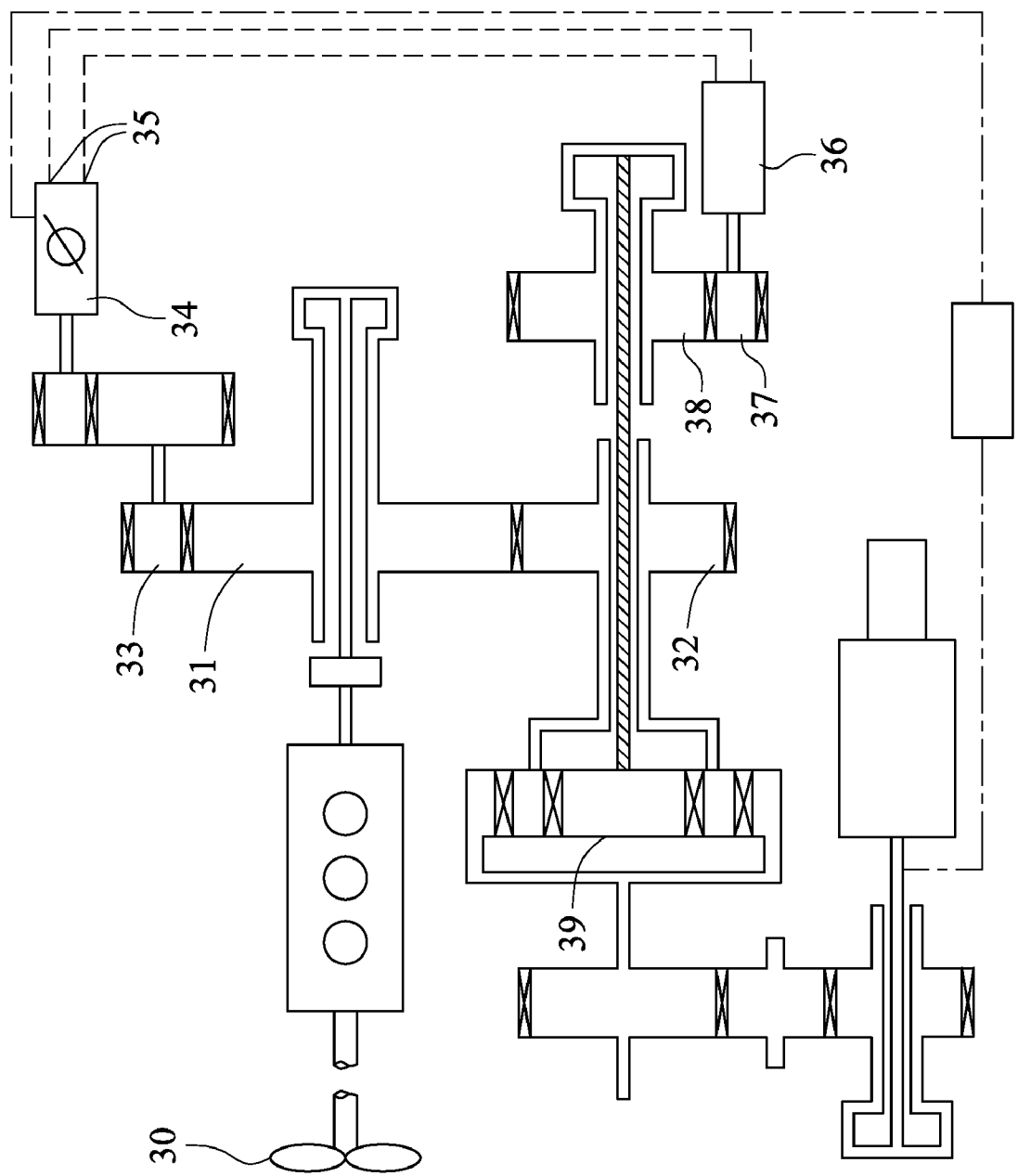
Figure 4:
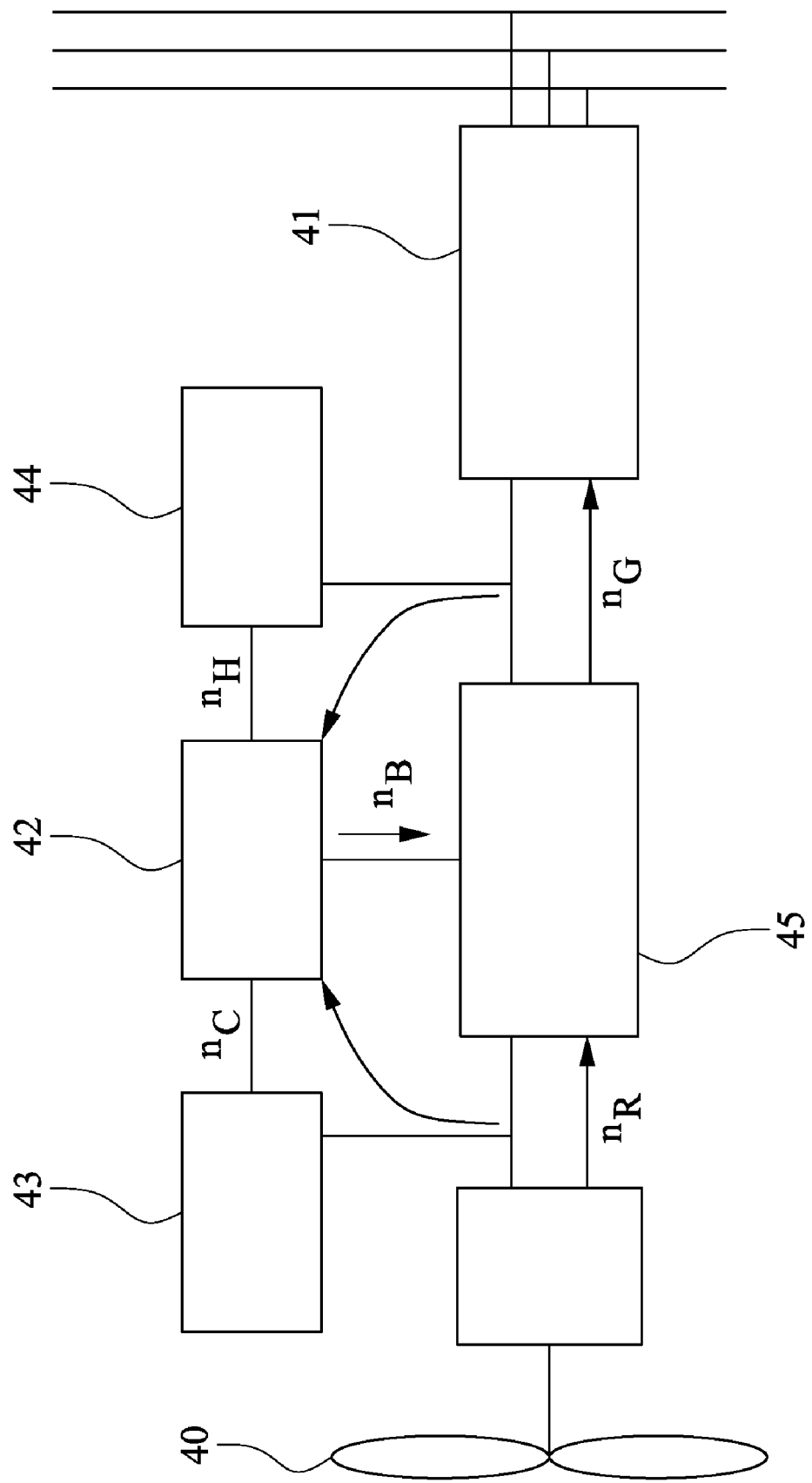
FIG. 4 is a schematic diagram of a power generating device capable of outputting at a constant rotation speed according to one embodiment of the present invention.

Please refer to FIG. 4, which is a schematic diagram of a power generating device capable of outputting at a constant rotation speed according to one embodiment of the present invention. In the present invention, a high-efficiency constant speed unit comprises two differential gear trains, a continuously variable transmission (CVT) mechanism and a hydraulic torque converter, as shown in FIG. 4. The rotation speed ($n_G$) is combined with the rotation speed ($n_R$) of a rotor 40 and the output rotation speed ($n_B$) of the second differential gear set 42. The output rotation speed ($n_B$) of the second differential gear set 42 is combined with the rotation speed ($n_c$) of the continuously variable transmission (CVT) mechanism 43 and the output rotation speed ($n_H$) of the hydraulic torque converter 44.

When the rotation speed ($n_R$) of the rotor 40 changes, the output rotation speed ($n_B$) of the second differential gear set 42 is adjustable to keep the rotation speed ($n_G$) of the electric generator 41 as a constant. The adjustment of the output rotation speed ($n_B$) of the second differential gear set 42 is achieved by adjusting the output rotation speed ($n_c$) of the continuously variable transmission (CVT) mechanism 43 or the output rotation speed ($n_H$) of the hydraulic torque converter 44.

Moreover, the output rotation speed ($n_c$) can be changed by adjusting the rotation speed ratio of the continuously variable transmission (CVT) mechanism 43; and the output rotation speed ($n_H$) can be changed by adjusting the rotation speed ratio of the hydraulic torque converter 44.

First Embodiment

Figure 5:
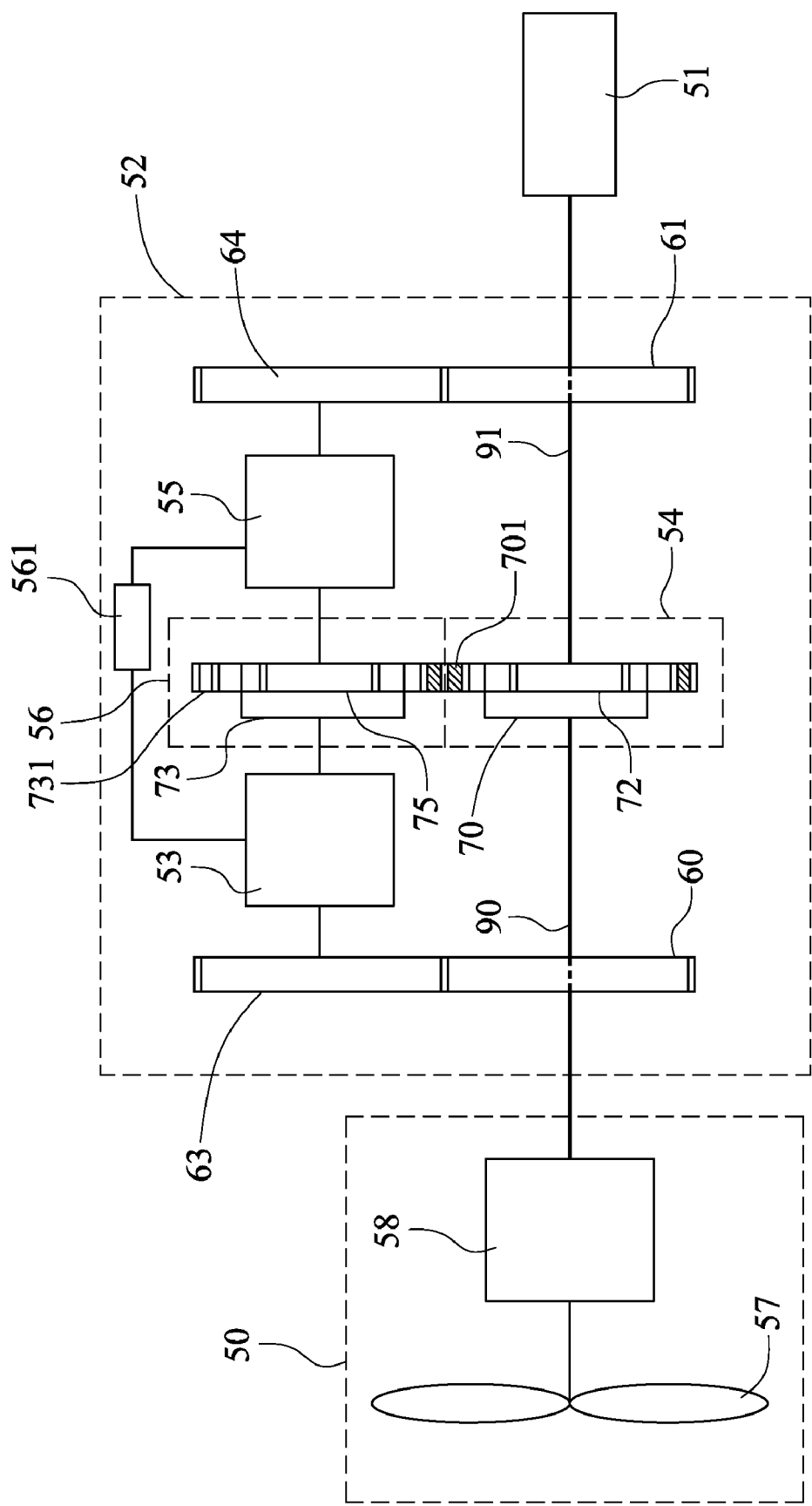
FIG. 5 is a schematic diagram according to a first embodiment of the present invention.

Please refer to FIG. 5, which is a schematic diagram according to a first embodiment of the present invention. The power generating device capable of outputting at a constant rotation speed comprises: a power source 50, an electric generator 51 and a constant speed unit 52. The constant speed unit 52 comprises: a continuously variable transmission (CVT) mechanism 53, a first differential gear set 54, a hydraulic torque converter 55 and a second differential gear set 56.

The power source 50 comprises a rotor 57 and a gear box 58. The rotor 57 is disposed at the frontmost portion of the power generating device and is followed by a gear box 58 to increase the rotation speed of the rotor 57. The electric generator 51 is disposed at the aftermost portion of the power generating device.

The first differential gear set 54 comprises a planet carrier 70, a sun gear 72 and a ring gear 701. The first differential gear set 54 is connected to the gear box 58 through a rotating shaft 90 and is connected to the continuously variable transmission (CVT) mechanism 53 through a gear 60 and a gear 63. Through the gear 60 and the gear 63, the partial power from the rotor 57 is transmitted into the first differential gear set 54, while the other power is transmitted into the continuously variable transmission (CVT) mechanism 53. The power transmitted into the continuously variable transmission (CVT) mechanism is transformed by the continuously variable transmission (CVT) mechanism 53 and then is transmitted into the second differential gear set 56 connected thereto.

The sun gear 72 is connected to the electric generator 51 through a rotating shaft 91 and connected to the hydraulic torque converter 55 through a gear 61 and a gear 64. Through the gear 61 and the gear 64, the partial power from the first differential gear set 54 is transmitted into the hydraulic torque converter 55, while the other power is transmitted into the electric generator 51. The power transmitted into the hydraulic torque converter 55 is transformed by the hydraulic torque converter 55 and then is transmitted into the second differential gear set 56 connected thereto.

The second differential gear set 56 comprises a planet carrier 73, a sun gear 75 and a ring gear 731. The output end of the continuously variable transmission (CVT) mechanism 53 is connected to the planet carrier 73 so that the power is transmitted into the second differential gear set 56. The output end of the hydraulic torque converter 55 is connected to the sun gear 75 so that the power from the hydraulic torque converter 55 is transmitted into the second differential gear set 56. These two parts of the power are combined by the second differential gear set 56, then the ring gear 731 and the ring gear 701 are used to transmit the composite power into the first differential gear set 54.

The constant speed unit 52 comprises a controller 561 for controlling the rotation speed of the continuously variable transmission (CVT) mechanism 53 and the rotation speed of the hydraulic torque converter 55 outputted to the second differential gear set 56.

Second Embodiment

Figure 6:
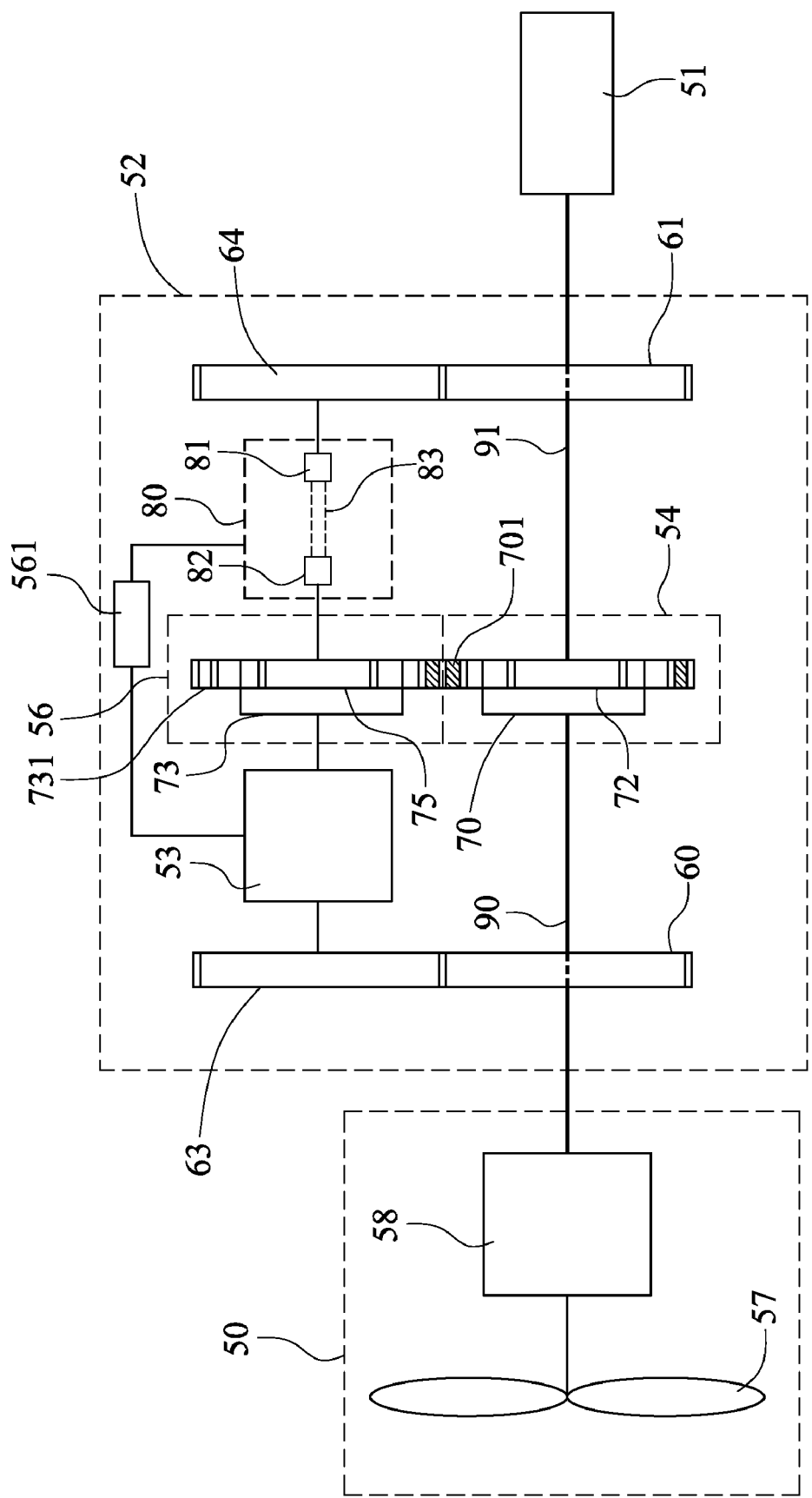
FIG. 6 is a schematic diagram according to a second embodiment of the present invention.

Please refer to FIG. 6, which is a schematic diagram according to a second embodiment of the present invention. The power generating device capable of outputting at a constant rotation speed comprises: a power source 50, an electric generator 51 and a constant speed unit 52. The constant speed unit 52 comprises: a continuously variable transmission (CVT) mechanism 53, a first differential gear set 54, a hydraulic static transmission device 80 and a second differential gear set 56.

The power source 50 comprises a rotor 57 and a gear box 58. The rotor 57 is disposed at the frontmost portion of the power generating device and is followed by a gear box 58 to increase the rotation speed of the rotor 57. The electric generator 51 is disposed at the aftermost portion of the power generating device.

The first differential gear set 54 comprises a planet carrier 70, a sun gear 72 and a ring gear 701. The first differential gear set 54 is connected to the gear box 58 through a rotating shaft 90 and is connected to the continuously variable transmission (CVT) mechanism 53 through a gear 60 and a gear 63. Through the gear 60 and the gear 63, the partial power from the rotor 57 is transmitted into the first differential gear set 54, while the other power is transmitted into the continuously variable transmission (CVT) mechanism 53. The power transmitted into the continuously variable transmission (CVT) mechanism is transformed by the continuously variable transmission (CVT) mechanism 53 and then is transmitted into the second differential gear set 56 connected thereto.

The sun gear 72 is connected to the electric generator 51 through a rotating shaft 91 and connected to the hydraulic transmission device 80 through a gear 61 and a gear 64. Through the gear 61 and the gear 64, the partial power from the first differential gear set 54 is transmitted into the hydraulic static transmission device 80, while the other power is transmitted into the electric generator 51. The power transmitted into the hydraulic static transmission device 80 is transformed by the hydraulic static transmission device 80 and then is transmitted into the second differential gear set 56 connected thereto.

The hydraulic static transmission device 80 comprises a hydraulic pump 81, a hydraulic motor 82 and a hydraulic pipeline 83. The hydraulic pump 81 is connected to the hydraulic motor 82 through the hydraulic pipelines 83.

The second differential gear set 56 comprises a planet carrier 73, a sun gear 75 and a ring gear 731. The output end of the continuously variable transmission (CVT) mechanism 53 is connected to the planet carrier 73 so that the power can be transmitted into the second differential gear set 56. The output end of the hydraulic static transmission device 80 is connected to the sun gear 75 so that the power from the hydraulic static transmission device 80 can be transmitted into the second differential gear set 56. These two parts of the power are combined by the second differential gear set 56, then the ring gear 731 and the ring gear 701 are used to transmit the composite power into the first differential gear set 54.

The constant speed unit 52 comprises a controller 561 for controlling the rotation speed of the continuously variable transmission (CVT) mechanism 53 and the rotation speed of the hydraulic static transmission device 80 outputted to the second differential gear set 56.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A power generating device capable of outputting at a constant rotation speed, comprising:
   a power source, an electric generator and a constant speed unit;
   wherein the constant speed unit further comprises:
      a hydraulic torque converter;
      a continuously variable transmission (CVT) mechanism;
      a first differential gear set comprising two input ends and an output end, wherein the first differential gear set is connected to the power source through a first transmission shaft comprising a first gear set connected to an input end of the continuously variable transmission (CVT) mechanism, and the first differential gear set is connected to the electric generator through a second transmission shaft comprising a second gear set connected to an input end of the hydraulic torque converter; and
      a second differential gear set comprising two input ends and an output end, wherein the two input ends of the second differential gear set are respectively connected to an output end of the continuously variable transmission (CVT) mechanism and an output end of the hydraulic torque converter, and the output end of the second differential gear set is connected to the other input end of the first differential gear set, so that the partial power is controlled by the second differential gear set and transmitted to the electric generator through the output end of the first differential gear set.

2. The power generating device capable of outputting at a constant rotation speed as recited in claim 1, wherein the power source further comprises a rotor and a gear box.

3. The power generating device capable of outputting at a constant rotation speed as recited in claim 1, wherein the constant speed unit further comprises a controller for controlling the output rotation speed of the continuously variable transmission (CVT) mechanism and the output rotation speed of the hydraulic torque converter.

4. A power generating device capable of outputting at a constant rotation speed, comprising:
   a power source, an electric generator and a constant speed unit;
   wherein the constant speed unit further comprises:
      a hydraulic static transmission device;
      a continuously variable transmission (CVT) mechanism;
      a first differential gear set comprising two input ends and an output end, wherein the first differential gear set is connected to the power source through a first transmission shaft comprising a first gear set connected to an input end of the continuously variable transmission (CVT) mechanism, and the first differential gear set is connected to the electric generator through a second transmission shaft comprising a second gear set coupled to an input end of the hydraulic static transmission device; and
      a second differential gear set comprising two input ends and an output end, wherein the two input ends of the second differential gear set are respectively connected to an output end of the continuously variable transmission (CVT) mechanism and an output end of the hydraulic static transmission device, and the output end of the second differential gear set is connected to the other input end of the first differential gear set, so that the partial power is controlled by the second differential gear set and transmitted to the electric generator through the output end of the first differential gear set.

5. The power generating device capable of outputting at a constant rotation speed as recited in claim 4, wherein the power source further comprises a rotor and a gear box.

6. The power generating device capable of outputting at a constant rotation speed as recited in claim 4, wherein the hydraulic static transmission device comprises a hydraulic pump and a hydraulic motor through a hydraulic pipeline.

7. The power generating device capable of outputting at a constant rotation speed as recited in claim 4, wherein the constant speed unit further comprises a controller for controlling the output rotation speed of the continuously variable transmission (CVT) mechanism and the output rotation speed of the hydraulic static transmission device.

* * * * *